United States Patent [19]
Hutchinson

[11] 3,809,963
[45] May 7, 1974

[54] POWER SUPPLY SYSTEM CONTROL CIRCUIT
[75] Inventor: Homer F. Hutchinson, Wheaton, Ill.
[73] Assignee: GTE Automatic Electric Laboratories Incorporated, Northlake, Ill.
[22] Filed: June 4, 1973
[21] Appl. No.: 367,076

[52] U.S. Cl. ............... 317/22, 317/36 TD, 317/54, 321/11, 321/21
[51] Int. Cl. ............................................ H02h 5/00
[58] Field of Search .......... 317/22, 36 TD, 54, 151, 317/DIG.6; 321/11, 21

[56] References Cited
UNITED STATES PATENTS
3,214,642   10/1965   Baude .................................. 317/54
3,116,440   12/1963   Baude .................................. 317/54

Primary Examiner—William M. Shoop, Jr.
Assistant Examiner—Harry E. Moose, Jr.
Attorney, Agent, or Firm—Robert F. Van Epps; L. N. Arnold

[57] ABSTRACT

A power supply system is disclosed which includes a control system that utilizes a sensing circuit to monitor the output load values and to automatically turn off the system if the values are outside of a predetermined range. The control system includes a manually operable switch which will initially immediately turn the power supply on as well as off, and incorporates a delay network which prohibits repeatedly turning the power supply on and off within a predetermined time period. Attempts to again turn the system on within the time period will result in resetting the delay network, causing the operator to wait the entire time period before the system can be again turned on.

15 Claims, 1 Drawing Figure

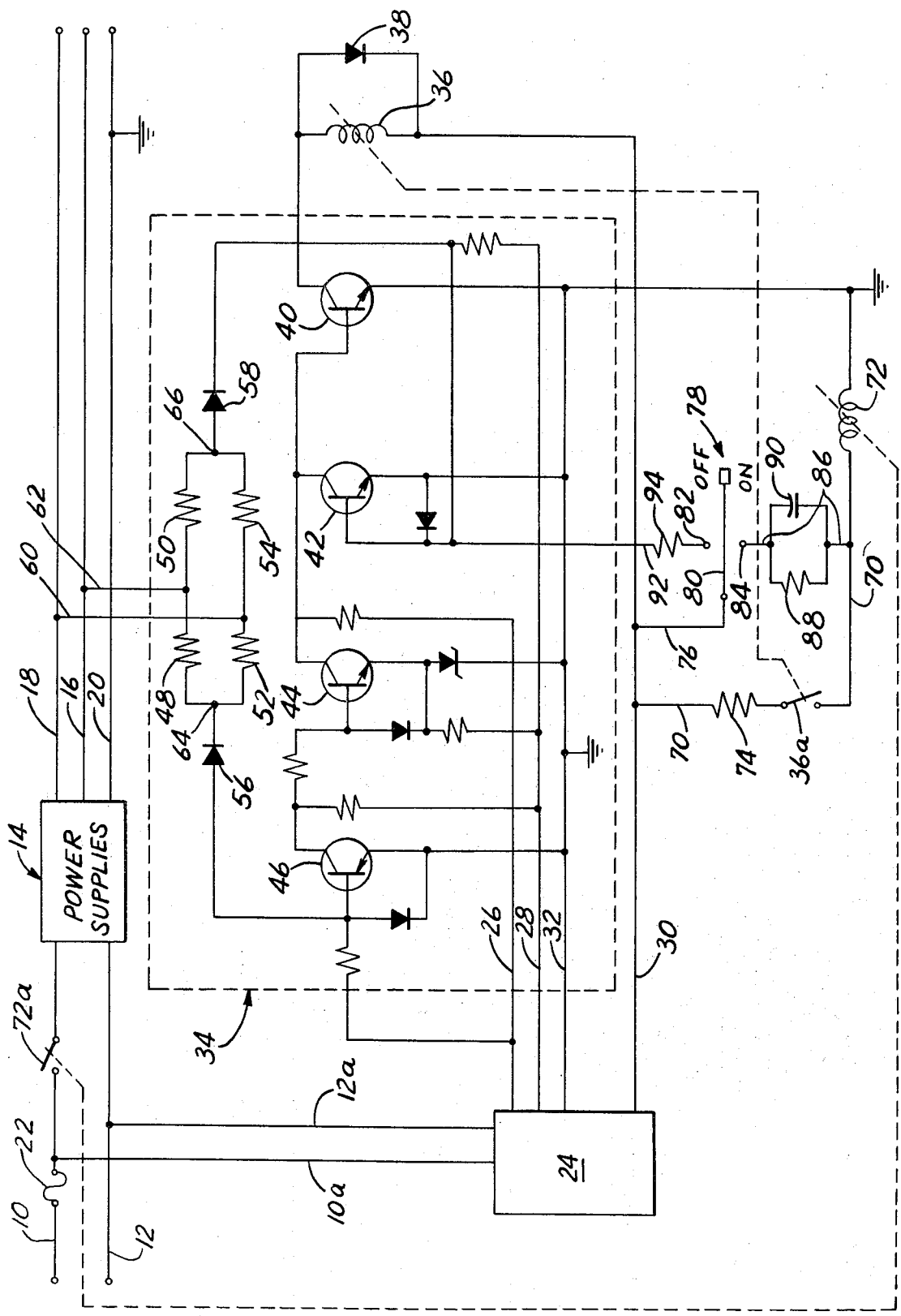

POWER SUPPLY SYSTEM CONTROL CIRCUIT

The present invention relates generally to power supply systems, and more particularly to power supplies having control circuits with a delay network therein.

Power supplies which include sensing circuits for monitoring the output being supplied to a load and which use this information in feedback control or other type of regulation are well known. Similarly, delay networks are often utilized for many reasons to prevent energization or deenergization of portions of circuitry. Such delay networks typically require that a time period expire before the controlled portion of the circuit is either activated or deactivated. In most instances, initial activation of a portion of the circuit (assuming activation is the mode of operation) will require expiration of the delay time period. More specifically, for example, if a capacitor is used in the delay network and the voltage across the capacitor is required to activate other portions of the circuitry, initial energization of the network will result in a delay until the capacitor is charged to the requisite voltage level that is sufficient to activate some other circuit component or the like. Thus, responsive to initial energization of the overall circuitry, a delay will result before the controlled component or other portions of the circuitry is energized. Alternatively, if it is required that a capacitor dissipate its charge before the controlled portion of the circuitry is deenergized, for example, deenergization will also be delayed by a time period characterized by the parameters of the delay network itself.

Accordingly, it is an object of the present invention to provide an improved power supply system that incorporates a delay network which performs its intended delay function after predetermined conditions are met.

A closely related and somewhat more specific object of the present invention is to provide such an improved power supply system wherein the control circuit permits the power supply to be immediately energized responsive to actuation of the manually operable switching means and also permits the power supply to be immediately turned off by the same switching means or by sensing an abnormal output characteristic and which thereafter precludes immediate repeated attempts to turn on the power supply system until the predetermined time period has expired.

Other objects and advantages of the present invention will become apparent upon reading the following detailed description while referring to the attached drawing which illustrates a schematic electrical diagram embodying the power supply system of the present invention.

Turning now to the drawing, a power supply system embodying the present invention is illustrated and includes input leads 10 and 12 for one or more individual power supplies indicated generally at 14 which has positive and negative voltage output leads 16 and 18, respectively, as well as ground lead 20 for connection to a load (not shown). The input leads 10 and 12 are preferably connected to a power source (not shown) which may be an a-c or d-c source and, similarly, the individual power supplies 14 may also be either a-c or d-c sources and may be regulated or non-regulated or a combination of both, since the present invention is applicable to such types of power supplies. The input lead 10 may be provided with a protective fuse 22 therein and, preferably, leads 10a and 12a provide a source of power for a control voltage power supply 24 having positive and negative output leads 26 and 28 as well as a control lead 30 and ground 32. The control voltage power supply 24 is energized as long as the source voltage is applied to the system, assuming that the fuse 22 remains intact.

A sensing circuit, indicated generally at 34, within the dashed lines is connected to the output leads 16 and 18 of the system to monitor the output values and detect whether voltage levels are within a predetermined range. While the illustrated sensing circuit monitors the output voltage in the leads 16 and 18, suitable well known circuitry could also be incorporated to monitor the current values as well. The power for the sensing circuit 34 is supplied by the control voltage power supply 24 through the output leads 26 and 28 and, accordingly, the output characteristics of the control voltage power supply must be compatible with the requirements for the circuit 34, and provide d-c output voltage regardless of whether the input signal to the control voltage power supply 24 is a-c or d-c. The voltage in the control lead 30 is preferably positive and continuous. The control lead includes the coil of a relay 36 (hereafter referred to only as the relay), having a normally open contact 36a, with the relay located between the sense circuit 34 and the power supply 24. A protective diode 38 may also be connected in parallel with the relay as shown. Switching means located within and controlled by the sensing circuit 34 is adapted to provide a ground path for the relay and permit current flow for pulling in the relay 36. If, when the power supply 14 is energized and the output voltages in the output leads 16 and 18 are within tolerance, the control lead 30 through the relay 36 is switched by the switching means from a floating condition to ground, providing a current path through the relay for energizing its coil causing the normally open contacts 36a to close. If the sensing circuit 34 detects an output voltage characteristic that is outside of a predetermined range, then the switching means within the sensing circuit 34 will open circuit the lead 30 and cause the relay to be deenergized and drop out contact 36a to its normally open condition.

More specifically, with respect to the sensing circuit 34 shown within the dashed lines, it comprises four transistors 40, 42, 44, 46 which are biased by the positive voltage lead 26, negative voltage lead 28 and the ground 32, in conjunction with a ratio sensing network comprising resistors 48, 50, 52 and 54 and diodes 56 and 58. A lead 60 connects the negative output lead 18 to a point intermediate the resistors 52 and 54 and a lead 62 connects the positive output lead 16 to a point intermediate the resistors 48 and 50. The values for the resistors 48–54 are determined so that a zero voltage occurs at both points 64 and 66 when the voltage levels within the output leads 16 and 18 are within a desired, predetermined range. For example, if the power supply 14 is designed to provide a voltage appearing in negative output lead 18 of −9 volts and +5 volts in positive output lead 16, then the voltages appearing at points 64 and 66 will be zero and no current will be produced that would alter the operation of the transistors therein. During normal operation and assuming no error, i.e., the voltage levels within the output leads 16 and 18 are within tolerance, transistor 40 is normally in conduction and transistors 42, 44 and 46 are non-conductive or off. However, in the event the negative voltage within output lead 18 (and using the previous example) increases from −9 volts to −10 volts, then the diode 56 will conduct and turn on transistor 46, which will turn on transistor 44 and turn off transistor 40. In this connection, relay 36 is switched by the transistor 40, so that when transistor 40 is conducting, current flow energizes relay 36 and when transistor 40 is non-conductive or off, there can be no current flow through the relay 36. Broadly stated, the sensing of an error condition in the output lead 18 will result in the normally conductive transistor 40 turning off, which will drop out the relay 36.

In the event of an error condition within the positive output lead 16 which, according to the previous example, was stated to be +5 volts, an increase in the voltage level to +6 volts, for example, will cause diode 58 to conduct, which is effective to turn on transistor 42 which similarly results in turning off transistor 40 causing the relay 36 to again drop out. From the brief foregoing description, it should be understood that an error condition in either of the output leads 16 or 18 will result in relay 36 being deenergized and will effectively turn off the power supply 14 as will be hereinafter described.

Turning now to an important aspect of the present invention, the control lead 30 has a lead 70 extending to a second relay 72 through relay contact 36a and resistor 74. Relay 72 has a normally open contact 72a located in the input lead 10 extending to the power supply 14. In this connection, it should be understood that while the lead 70 is connected to the control lead 30, it can be directly connected to the control voltage power supply 24 if desired. Similarly, another lead 76 is connected to control lead 30 intermediate the control voltage power supply 24 and relay 36 and is connected to a preferably momentary contact, double throw, manually operatable switch, indicated generally at 78. As shown, lead 76 is connected to a movable contact 80 that may be moved in either direction to provide electrical continuity with either stationary contact 82 or 84, with switching to contact 82 being effective to turn off power supply and to contact 84 to turn it on. Contact 84 is connected to relay 72 through lead 86 which includes a resistor 88 and capacitor 90 connected in parallel. The off contact 82 of the switch 78 is connected through a lead 92 having a resistor 94 therein to the sensing circuit 34 and more specifically to the base of transistor 42. By moving the switch 78 to the "off" position, the voltage in the control lead 30 is applied to the sensing circuit 34 through the current limiting resistor 94 and switches normally off transistor 42 into conduction which turns transistor 40 off and drops out relay 36. In effect, moving switch 78 to its off position produces a forced error signal which activates the transistors 42 and 40 in the sensing circuit 34 to drop out relay 36 as well as relay 72 as will be subsequently described.

To initially turn on the power supply system of the present invention, switch 78 is moved to its "on" position to apply the positive voltage in control lead 30 to the resistor 88 and capacitor 90 and to the relay 72 which has its normally open contact 72a located in the input lead 10 as previously mentioned. Thus, when switch 78 is moved to the on position, d-c voltage is applied to capacitor 90 and, assuming that the capacitor is initially discharged, the full voltage will be applied to the relay coil 72 causing its contacts 72a to close. In this regard, relay 72 must have operational parameters that are compatible with the overall power system in terms of the length of time it requires to pull in and transfer its contacts, the resistance of the relay coil and the minimum voltage that is necessary to initially pull in the contacts. Moreover, a relay should be specified which will require substantially less than its rated voltage to hold the relay in its pulled in condition and, to this end, it is reasonable that a relay will be capable of being pulled in at 80 percent of its rated voltage and remain in its pulled in condition at 10 percent of its rated voltage. Resistor 74 located in lead 70 must be sufficiently large that the voltage applied to relay 72 when relay contact 36a is closed is only sufficient to hold in the relay 72 and not large enough to initially pull it in. If enough voltage was applied through lead 70 to pull in relay 72, the switch 78 would be ineffective since, as previously mentioned, relay 36 is normally energized and only drops out because of an error condition.

The voltage across the capacitor 90 is a function of time, and is determined by the values of the components in the circuit, namely, the value of the capacitor 90 itself, as well as the resistance and inductance of the relay coil 72. The application of voltage to the capacitor 90 will result in voltage being initially applied to relay 72 and will thereafter decrease as the capacitor becomes charged. Therefore, the selection of the capacitor 90 must be such that the voltage across the capacitor will be sufficiently low during the pull-in time of the relay so as to be compatible with the overall circuit operation, i.e., the contact 72a will become closed within the time that voltage is applied and will remain energized for some additional time as the voltage applied to the relay 72 decreases.

In accordance with an important aspect of the present invention, while initial turning on of the power supply is accomplished by the switch 78 effecting the application of voltage to relay 72, the power supply system will not remain on unless relay 36 remains energized for the reason that capacitor 90 will charge to a value so that voltage is no longer applied to relay 72 in an amount sufficient to keep it in its pulled in condition. However, once relay 72 pulls in, power at the input 10 is applied to the power supply 14 which results in output signals being generated in the output leads 16 and 18 being monitored by the sensing circuit 34. If the values of the output signals are within the prescribed tolerances, the sensing circuit 34 will be unaffected and relay 36 will remain energized and the current supplied through lead 70 will be sufficient to maintain relay 72 energized, even though capacitor 90 becomes fully charged. In effect, lead 70 with the closed relay contact 36a provides a by-pass to the delay network defined by the resistor 88 and capacitor 90 and maintains the power supply system in an on condition so long as the output voltage levels are within tolerance.

Should an overvoltage or undervoltage condition be sensed by the sensing circuit 34, transistor 40 will be turned off and thus open circuit the relay 36 and cause its contact 36a to open, thus removing voltage from the relay 72. Accordingly, deenergization of relay 72 will open and cut off input power to the power supply 14, shutting off the entire system. As previously mentioned, moving the switch 78 to its off position will also provide a forced error signal that will accomplish the same result. In this regard, the resistor 94 should be of a value so the current passed to the transistor 42 within the sensing circuit 34 is compatible with its current capabilities.

From the foregoing detailed description, it should be understood that when the power supply system is initially turned on, it is not dependent upon any time delay and is immediately turned on responsive to operation of the switch 78. Similarly, turning off the power supply is immediately accomplished, whether it is due to manual operation of the switch 78 or from an abnormal output voltage that automatically shuts off the power supply system. Thus, initial turn on and subsequent turn off of the system is not time dependent, except insofar as the small time increments necessary to effect pull in of the relay 72 and the like.

In keeping with the present invention, however, after the power supply system has been turned off, operation of the manual switch 78 to repeatedly attempt to turn the power supply system back on will be prohibited for a predetermined time period after the first attempt is made. This predetermined time period is a function of the RC time constant of resistor 88 and capacitor 90. Resistor 88 provides a discharge current path for the capacitor 90 and the time period can be varied depending upon the choice of values for the two components. If an operator repeatedly attempts to turn the power system back on after it has been turned off for any reason, and the capacitor 90 is not sufficiently discharged to pass voltage therethrough to energize and pull in the relay 72, it is not possible to again turn on the power system and the relay contact 72a will remain in its normally open position. Thus, if the power system is automatically turned off due to an overvoltage condition, for example, in either of the output leads 16 or 18, the delay network comprising resistor 88 and capacitor 90 will provide protection against an operator repeatedly trying to turn the power system back on. For example, if the RC time constant is approximately 3 seconds, it will require about 10 to 15 seconds to discharge the charged capacitor 90 to the extent that the "on" circuit will be operative again. If an operator holds the switch 78 in its on position before expiration of the predetermined time period while the "on" circuit is inoperative, the capacitor will merely become fully charged and the operator will be required to wait the full 10 to 15 seconds after releasing the switch 78 before the "on" circuit will again become operative.

While the time delay for again turning the power system on does not provide an absolute deterrent to turning on the power system after it has been automatically shut off due to automatic operation of the sensing circuits 34, it has the effect of delaying the turning on thereof after the first attempt to turn it back on and such delay may result in the operator thinking that there may be some malfunction within the system which should be investigated. Hopefully, the delay will provoke the operator into thinking of the various possibilities and may result in investigation rather than immediate reenergization of the power supply system which could conceivably cause additional damage to either the power supply system itself or to the load to which it is attached. Moreover, a technician who merely sees that the power supply system is turned off by virtue of an indicator light or the like and who may unsuspectingly attempt to turn the power supply back on, will be thwarted in his repeated efforts if the attempts are made within the predetermined delay time period. The ineffectiveness of his repeated attempts may alert him to the fact that he should not be operating equipment that is beyond his responsibility or capabilities.

Thus, the power supply system embodied in the present invention provides a useful measure of protection for both the overall system in which the power supply system is incorporated, as well as the power supply system itself.

While the switch 78 is shown to comprise a two position momentary contact switch, it should be understood that two separate momentary contact switches may also be provided. Additionally, while the illustrated sensing circuit is described with respect to turning the transistors on and off therein, it should be understood that the transistors are not necessarily changed from saturation to cut off during operation, but may utilize changes in conduction levels that are sufficient to energize and deenergize the relay 36. The sensing circuit 34 may be of other designs including operating amplifiers that utilize a fixed reference voltage or some other voltage monitoring scheme.

More broadly, it should also be understood that although a preferred embodiment of the present invention has been illustrated and described, there are also other modifications which will be apparent to those skilled in the art; and, accordingly, the scope of the present invention should be defined only by the appended claims and equivalents thereof.

Various features of the invention are set forth in the following claims.

What is claimed is:

1. A power supply system capable of being initially manually turned immediately on and off responsive to actuation of a switch, but which is incapable of being turned on by repeated attempts within a predetermined time, comprising:

a main power supply having input and output leads for connecting to a power source and a load, respectively;

a control voltage power supply having input leads connected to the power source and output leads for supplying power to a sensing circuit and to a control lead;

a sensing circuit having switching means for monitoring the output values of said main power supply and for operating said switching means in reponse to the output values of said main power supply being outside of a predetermined range;

said control lead extending from said control power supply to said switching means and including a first relay that is energized when said output values are within said predetermined range and deenergized when said values are outside of said predetermined range;

manually operable switching means connected to said control voltage power supply and including normally open circuited first and second current paths, said first current path containing a second relay having a normally open contact located in one of the input leads of said main power supply, operation of said manually operable switching means closes said first current path so that said second relay energizes said main power supply;

said manually operable switching means including said normally open circuited second current path which interconnects said control lead and said sensing circuit so that closing said second current path produces an error signal within said sensing circuit which causes said switching means to open circuit said control lead and deenergize said first relay;

said first current path including a capacitor and resistor connected in parallel between said manually operable switching means and said second relay, said capacitor and resistor comprises a delay network that initially passes voltage therethrough to initially energize said second relay in response to operation of the manually operable switching means but which provides a delay period prohibiting immediate turn-on when said capacitor is charged;

said control voltage power supply being connected to said second relay through said normally open contacts of said first relay so as to bypass said capacitor after initial turn-on, the deenergization of said first relay effecting deenergization of said second relay to open circuit the input lead to said main power supply and thereby shut off said power supply system.

2. A power supply system as defined in claim 1 wherein said parallel connected resistor and capacitor within said first current path is effective to block voltage application to said second relay for a predetermined time after said capacitor has been charged to thereby preclude repeated attempts to turn on the system responsive to actuation of said manually operable switching means.

3. A power supply system as defined in claim 1 wherein the input leads for said control voltage power supply are connected to said input leads of said main power supply, one of said input leads for said control voltage power supply being connected ahead of said contact so that power is supplied to said control voltage power supply notwithstanding the position of said contact.

4. A power supply system as defined in claim 1, wherein aid second relay requires at least about 80 percent of rated voltage to pull in its contact and at least about 10 percent of rated voltage to remain pulled in.

5. A power supply system as defined in claim 1, wherein said manually operable switching means comprises a momentary contact, double throw switch.

6. A power supply system as defined in claim 1, wherein said predetermined time period is about 10 to 15 seconds, provided said capacitor is initially substantially fully charged prior to being dissipated.

7. A power supply system as defined in claim 1, wherein said sensing circuit includes a ratio sensing circuit for monitoring the voltage levels in said output leads and producing current flow therein responsive to said voltage level in each of said leads being outside of said predetermined range.

8. A power supply as defined in claim 7 wherein said switching means comprises a switching semiconductor device for open and close circuiting said control lead responsive to the presence or absence of current flow, respectively, in said ratio sensing circuit.

9. A power supply system having input and output leads and capable of being immediately initially turned on and off in response to operation of a manually operable switching means, but which is incapable of being turned on during a predetermined time responsive to repeated attempts, comprising:

a main power supply connected between said input and output leads and having a normally open relay contact in one input lead thereof such that said power system is turned off when said relay contact is open;

a control voltage power supply connected to said power system input leads and energized notwithstanding the position of said input lead relay contact, said control voltage power supply having a dc. output connected to a sensing circuit and to a control lead in which a positive dc. voltage is continuously applied;

a sensing circuit for monitoring the values of said power system output leads, including switching means, said switching means closing said control voltage power supply control lead in response to values of said output leads being within predetermined limits and opening said control lead in response to said values being outside of said predetermined limits, said control lead including a first relay therein;

a holding circuit connected to said control voltage power supply and including a normally open contact of said first relay and a second relay controlling said input lead normally open contact, the energization of said first relay maintaining said second relay energized after it has been pulled in, provided the output values of said main power supply are within said predetermined limits so as to maintain said first relay energized;

manually operable switching means for initially energizing said second relay and including a first current path having a parallel connected resistor and capacitor intermediate the second relay and said manually operable switching means, said capacitor passing voltage to said second relay to energize the same until such time as the capacitor becomes charged and said voltage blocked;

said manually operable switching means including a second current path between said control voltage supply and said sensing circuit for providing a forced error signal causing said switching means to open said control lead and deenergize said first relay and thereby deenergize said second relay and shut off that power supply;

said parallel connected resistor and capacitor defining a delay network that prevents reenergization of said second relay until said capacitor is sufficiently discharged, to thereby preclude manual turn on of said power supply within a predetermined time period.

10. A power supply system as defined in claim 9 wherein said manually operable switching means comprises a two position momentary contact switch for closing said first current path when it is moved to a first position and for closing said second current path when it is moved to a second position.

11. A power supply system as defined in claim 9 wherein said second relay requires a first voltage level to energize the same and effect transfer of its contact and a second lower voltage level to maintain the relay energized and hold the contact in its transferred position.

12. A power supply system as defined in claim 11 wherein said holding circuit includes a voltage dropping resistor therein for reducing the voltage applied to said second relay to a level sufficient to hold in said second relay, but insufficient to initially pull in the same.

13. A power supply system as defined in claim 9, wherein said predetermined time period is about 10 to 15 seconds, provided said capacitor is initially substantially fully charged prior to being dissipated.

14. A power supply system as defined in claim 9, wherein said sensing circuit includes a ratio sensing circuit for monitoring the voltage levels in said output leads and producing current flow therein responsive to said voltage level in each of said leads being outside of said predetermined range.

15. A power supply as defined in claim 14 wherein said switching means comprises a switching semiconductor device for opening and closing said control lead responsive to the presence or absence of current flow, respectively, in said ratio sensing circuit.

* * * * *

UNITED STATES PATENT OFFICE
CERTIFICATE OF CORRECTION

Patent No. 3,809,963  Dated May 7, 1974

Inventor(s) HOMER F. HUTCHINSON

It is certified that error appears in the above-identified patent and that said Letters Patent are hereby corrected as shown below:

Column 7, line 37 before "contact" insert -- relay

Column 7, line 41, "aid" should read -- said --

Signed and sealed this 24th day of September 1974.

(SEAL)
Attest:

McCOY M. GIBSON JR.
Attesting Officer

C. MARSHALL DANN
Commissioner of Patents